(12) United States Patent
Graaff et al.

(10) Patent No.: US 7,258,391 B2
(45) Date of Patent: Aug. 21, 2007

(54) THIN SECTION SIDEWALL ASSEMBLIES FOR VANS AND TRAILERS

(75) Inventors: Wolfgang Graaff, Chicago, IL (US); Thomas Huddle, Charleston, IL (US)

(73) Assignee: Great Dane Limited Partnership

( * ) Notice: Subject to any disclaimer, the term of this patent is extended or adjusted under 35 U.S.C. 154(b) by 0 days.

(21) Appl. No.: 11/262,480

(22) Filed: Oct. 31, 2005

(65) Prior Publication Data

US 2006/0071507 A1 Apr. 6, 2006

Related U.S. Application Data

(60) Continuation of application No. 10/772,147, filed on Feb. 4, 2004, now Pat. No. 7,011,358, which is a continuation of application No. 10/252,354, filed on Sep. 23, 2002, now abandoned, which is a division of application No. 09/724,137, filed on Nov. 28, 2000, now Pat. No. 6,607,237.

(60) Provisional application No. 60/195,036, filed on Apr. 6, 2000.

(51) Int. Cl.
*B62D 25/02* (2006.01)
(52) U.S. Cl. .................................. 296/186.1
(58) Field of Classification Search ............... 296/191, 296/186.1, 182.1, 186.5, 186.4, 39.1; 52/588.1, 52/582.1, 584.1
See application file for complete search history.

(56) References Cited

U.S. PATENT DOCUMENTS

| | | |
|---|---|---|
| 3,393,920 A | 7/1968 | Ehrlich |
| 4,015,876 A | 4/1977 | Hulverson et al. |
| 4,357,047 A | 11/1982 | Katz |
| 4,420,183 A | 12/1983 | Sherman |
| 4,904,017 A | 2/1990 | Ehrlich |
| 4,940,279 A | 7/1990 | Abott et al. |
| 5,509,714 A | 4/1996 | Schmidt |
| 5,664,826 A | 9/1997 | Wilkens |
| 5,860,693 A | 1/1999 | Ehrlich |
| 5,876,089 A | 3/1999 | Ehrlich |
| 5,938,274 A | 8/1999 | Ehrlich |
| 5,992,117 A | 11/1999 | Schmidt |
| 5,997,076 A | 12/1999 | Ehrlich |

OTHER PUBLICATIONS

Engineering drawing Great Dane Trailers entitled, "Post/Liner Layout Strick, Trailmobile," undated.

*Primary Examiner*—Joseph D. Pape
(74) *Attorney, Agent, or Firm*—Baker & Daniels LLP

(57) ABSTRACT

Several embodiments of sidewall assemblies having side posts and plastic liners affixed to an outer side sheet of a van or trailer. The liners have edges extending in contacting relationship with the edge portions of the side posts in connected relationship. Protuberances and foam material extend between the plastic liners and the side sheet for added strength. Slots may be provided in the posts for securement purposes.

56 Claims, 6 Drawing Sheets

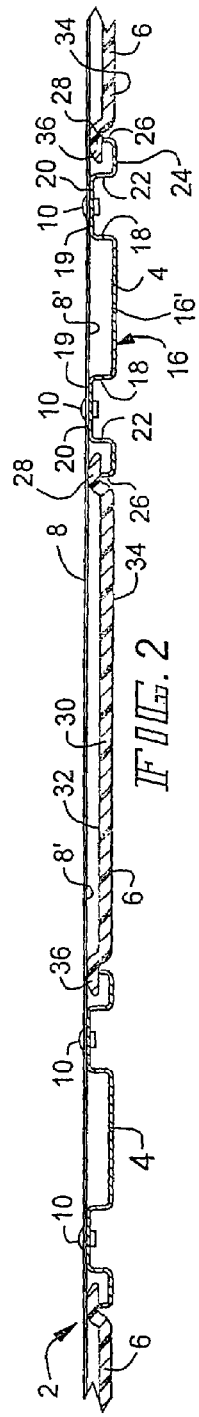
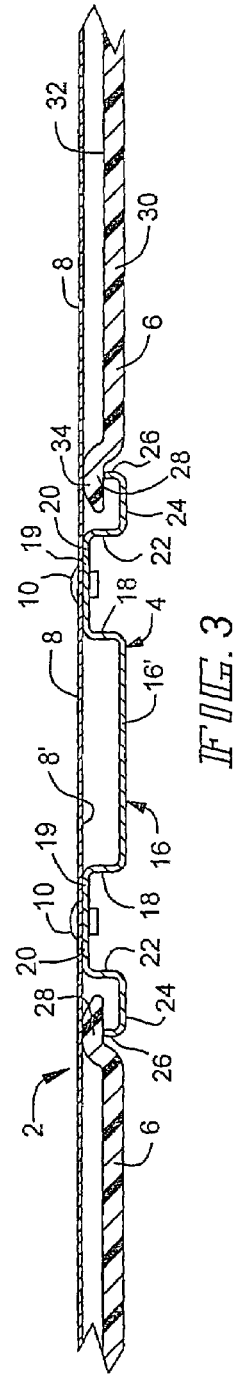
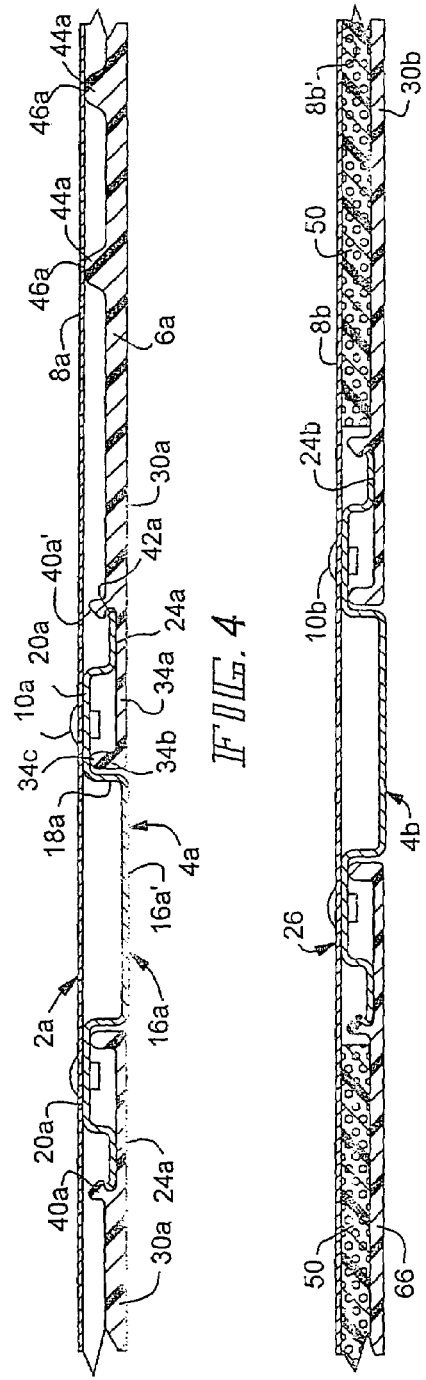
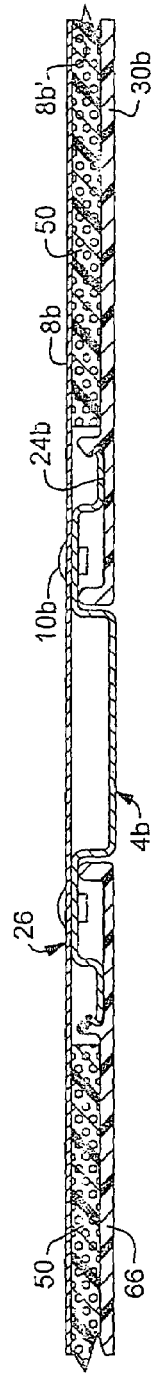
FIG. 2
FIG. 3
FIG. 4
FIG. 5

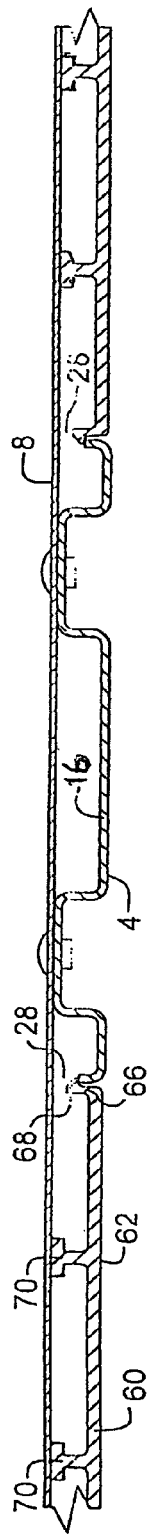
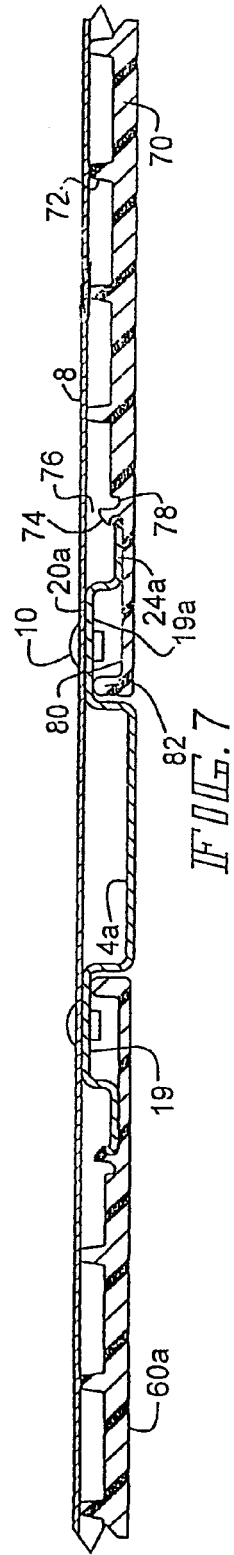
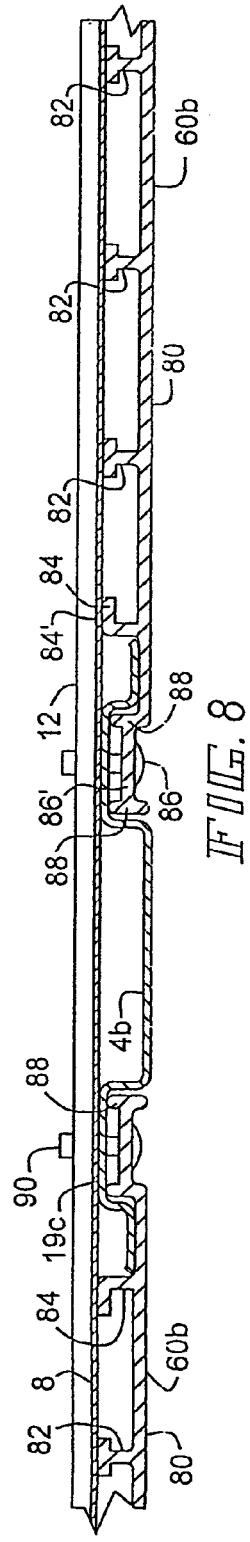
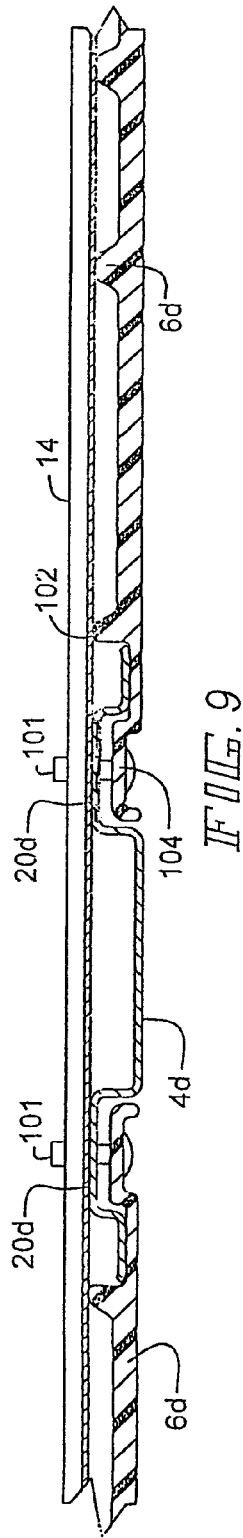

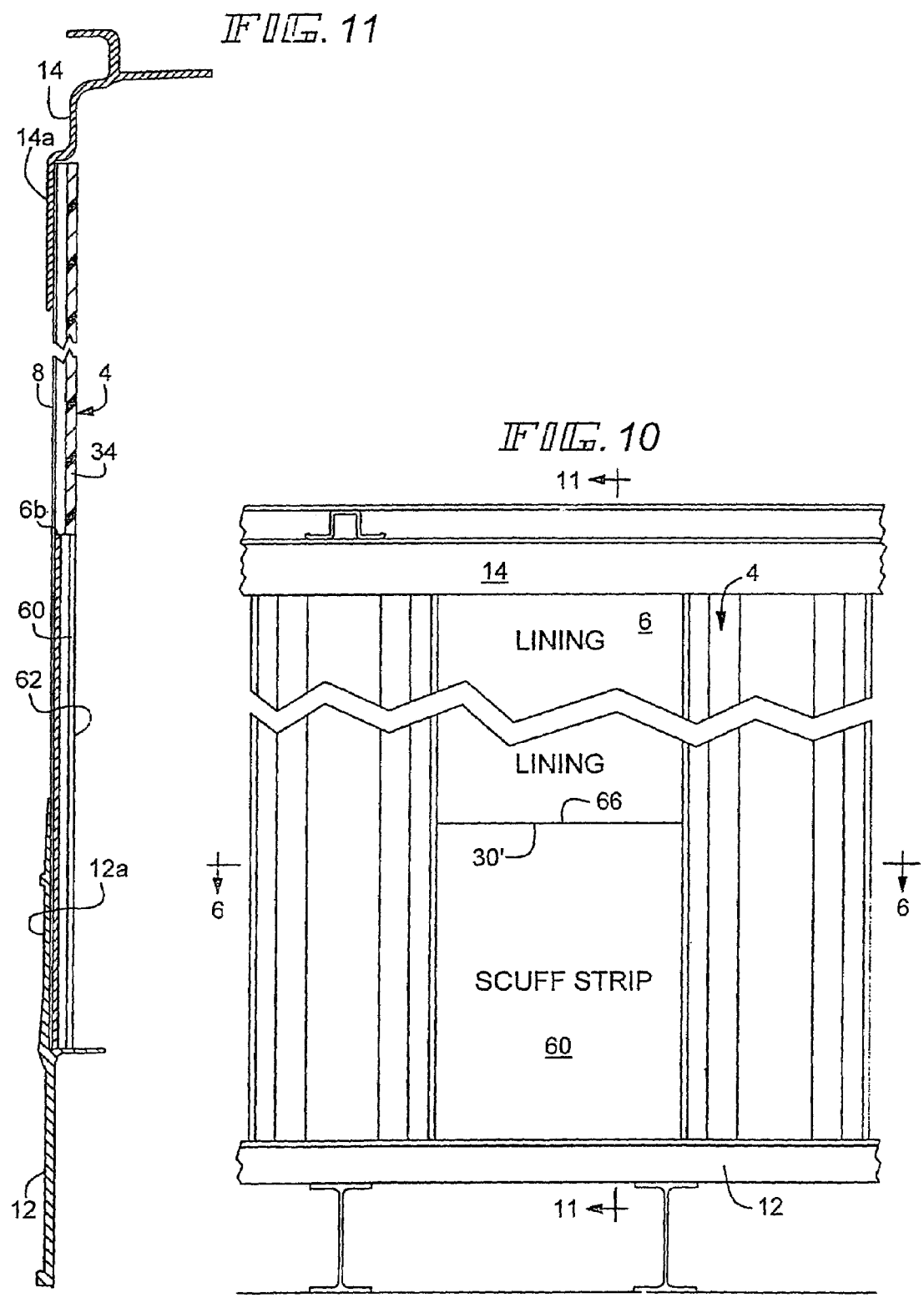

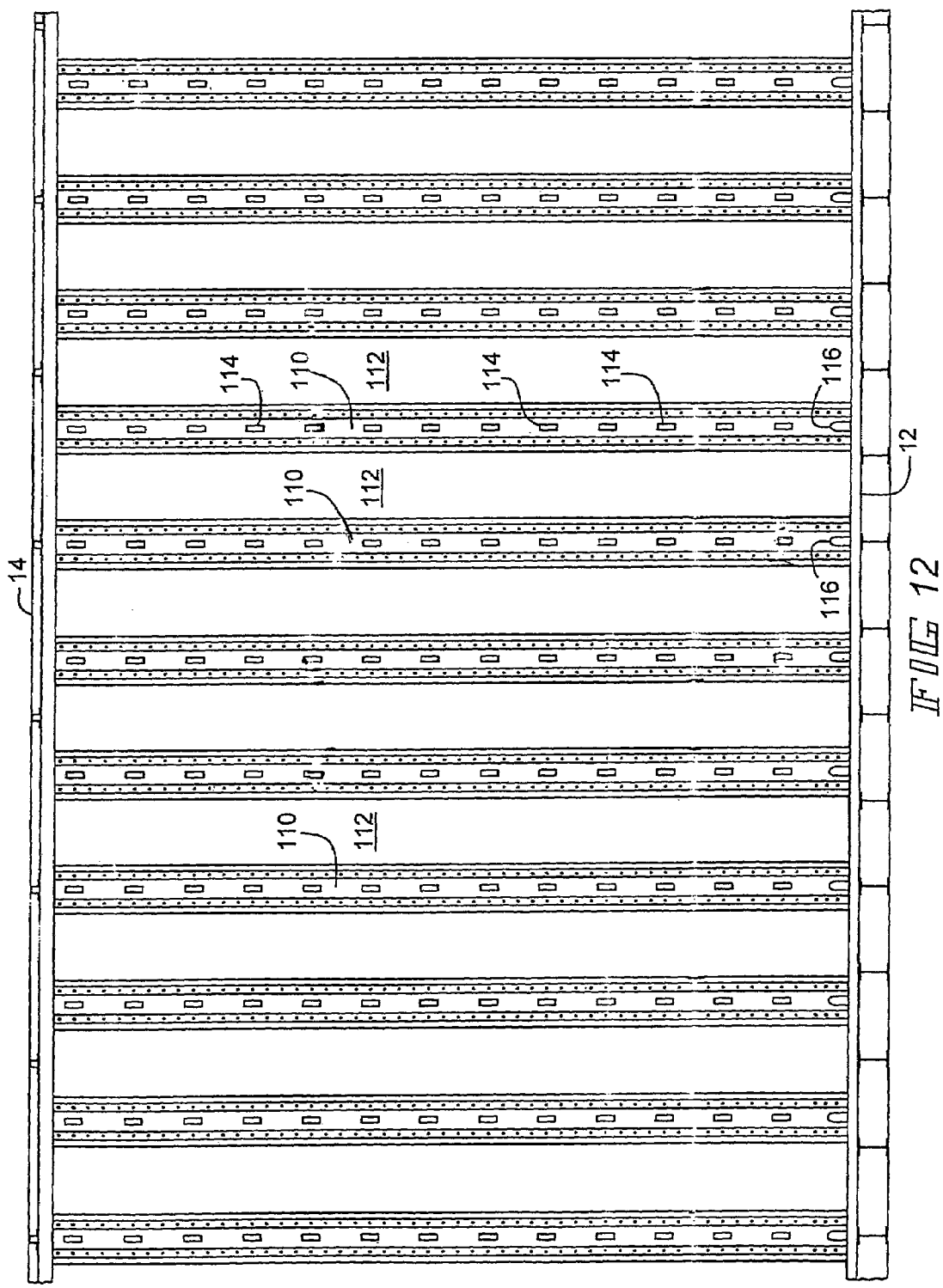

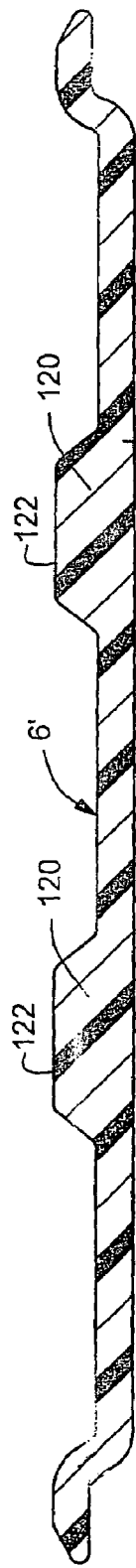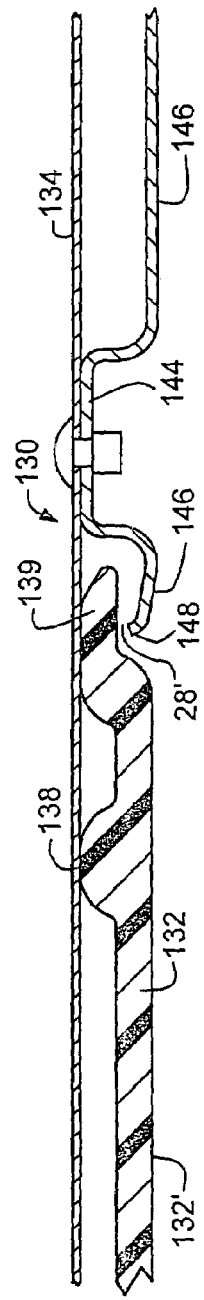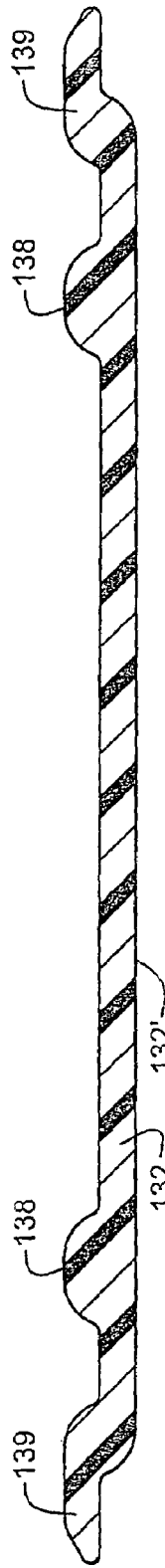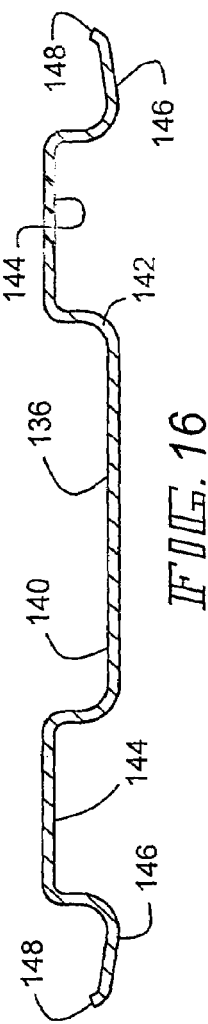

THIN SECTION SIDEWALL ASSEMBLIES FOR VANS AND TRAILERS

This application is a continuation of U.S. patent application Ser. No. 10/772,147, filed Feb. 4, 2004, now U.S. Pat. No. 7,011,358, which is a continuation of U.S. patent application Ser. No. 10/252,354, filed Sep. 23, 2002, abandoned, which is a divisional of U.S. patent application Ser. No. 09/724,137, filed Nov. 28, 2000, now U.S. Pat. No. 6,607,237, which claims priority to U.S. Provisional Patent Application Ser. No. 60/195,036, filed Apr. 6, 2000.

BACKGROUND OF THE INVENTION

1. Field of the Invention

This invention relates in general to cargo carrying vehicles and more particularly, to several embodiments of sidewall assemblies, with or without scuff strips, having refined widths in a vehicular van or trailer.

2. Summary of the Prior Art

In the past the sidewall structure of cargo carrying vans and trailers is constructed having a typical design and width. The usable capacity of the van or trailer is dependent in part on the width of the opposed sidewall assemblies. The width of long used sidewalls on a van and the like is at least 1.5 inches and comprises a plurality of hat-shaped side posts to which outer and inside side sheets which are riveted by a series of vertically aligned rivets. Attempts have been made to reduce the thickness of the standard sidewalls so that usable space of a van or trailer can be increased. An example of one prior art design for reducing sidewall thickness comprises a thick aluminum plate to which a shallow shaped beam is riveted at the vertical interface between adjacent plates. Such a known plate construction is capable of reducing the thickness of each opposed sidewall structure to approximately 5/8 inch. Other prior designs have also attempted to reduce the thickness of the sidewall by employing a pair of thin metal plates sandwiched over a polyethylene material to form a composite structure having no side posts or beams. The foregoing techniques present several disadvantages including higher weight repair costs, reduced number of logistic posts required for securing loads, or produce a highly flexible structure which may be unsuitable under all loading conditions. All of the known sidewall assemblies further require the extensive use of mechanical fasteners, such as rivets, that results in uneconomical labor costs and time in assembly as well as contributing to additional weight of the sidewalls. Accordingly, it is desirable in the prior art to provide sidewall assemblies for vans and trailers having an optimally thin cross section and which reduce cost of fabrication and assembly and maintains the weight compared to today's standards.

SUMMARY OF THE INVENTION

It is therefore an objective of the invention to provide several embodiments of sidewall assemblies for use in trailers and vans which optimally reduce the thickness and weight of the side structures. The sidewall assemblies of the invention possess suitable higher strength and stiffness characteristics to resist bending and failure while possessing an optimally thin cross section for increasing the usable cargo or article carrying space within a van or trailer. The side assemblies herein disclosed have uniquely shaped side posts interconnecting with an outer side sheet and a plurality of plastic interior panels or liners or lower scuff sheet. The construction of the side assemblies permit the exchange of posts and sheets without significant disassembly of posts and liners in the event of any needed repair. The design of the sidewall herein disclosed reduces cross section thickness up to less than 0.50 inches and provides a smooth interior sidewall having a lighter color to lighten up the darkness of the interior of the van. The plastic liners may interlock with the side posts of the invention through use of a snap on construction, through a sliding insertion, or through mechanical fasteners. In some uses of the invention, the interior of the sidewall assemblies can be sealed in a manner to prevent a build-up of dirt and to maintain sanitary interior conditions. The spacing between the outer side sheet and the plastic panel may include foam or protuberances to increase the rigidity of the sidewall structure of the invention. In all embodiments herein disclosed, the number of required mechanical fasteners is reduced as compared to prior art structures to increase the ease of assembly.

BRIEF DESCRIPTION OF THE DRAWINGS

FIG. 2 is a partial top plan view, with parts in section, of the sidewall assembly of the invention taken along lines 2-2 of FIG. 1;

FIG. 3 is a partial top plan of the sidewall assembly of the invention taken along lines 3-3 of FIG. 1;

FIG. 4 is a partial top plan view, with parts in section, of a second embodiment of the sidewall assembly of the invention;

FIG. 5 is a partial top plan view, with parts in section, of a third embodiment of the sidewall assembly for vans of the invention;

FIG. 6 is a partial top plan view, with parts in section, of a first embodiment of the scuff strip of the invention for use with the side assembly of FIG. 2 of the invention;

FIG. 7 is a partial top plan view, with parts in section, of a fourth embodiment of the side wall assembly of the invention;

FIG. 8 is a partial top plan view, with parts in section, of a second embodiment of the scuff strip of the invention attached to the bottom chord;

FIG. 9 is a partial top plan view, with parts in section, of a liner and side post attached to the upper chord;

FIG. 10 is a partial side elevational view of the interior of the sidewall assembly of FIG. 1 having scuff plates;

FIG. 11 is a partial end elevational view of the sidewall assembly of FIG. 10;

FIG. 12 is a partial side elevational view of the sidewall assembly of FIG. 1 having slotted posts;

FIG. 13 is a top plan view, with parts in section, of another embodiment of the liner of the invention for use with the embodiment of the side wall assemblies of FIG. 2;

FIG. 14 is a top partial plan view, with parts in section, of a fifth embodiment of the side wall assembly of the invention;

FIG. 15 is a top plan view, with parts in section, of still another embodiment of the liner of the invention for use with the side assembly of the invention shown in FIG. 14; and FIG. 16 is a top enlarged plan view, with parts in section, of the side post of FIG. 15.

DESCRIPTION OF THE PREFERRED EMBODIMENTS

Figure 1:
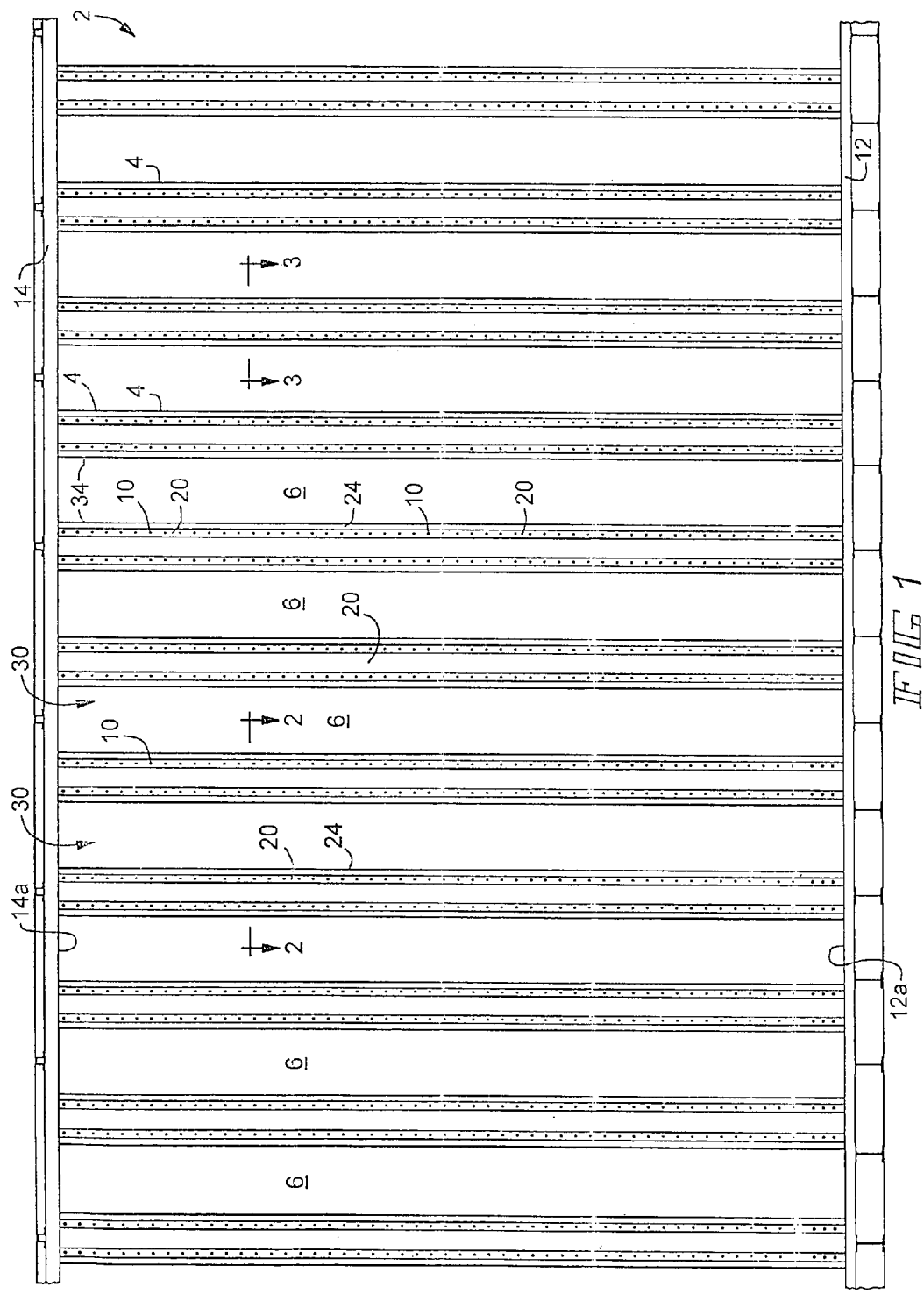
FIG. 1 is a partial side elevational view of a first embodiment of the sidewall assembly of the invention.

Referring now to FIGS. 1 to 3 there is illustrated a first embodiment of the side assembly of the invention generally designated by reference numeral 2. The side assembly 2 of the invention is intended to be used as a sidewall structure of a cargo or article carrying van or trailer (not shown). As seen in FIGS. 1 to 3, the sidewall assembly 2 comprises a plurality of special vertical wide based shallow side posts 4 which interconnect with an interior plastic panel or liner 6 and an outer sidewall sheet 8. The sidewall assembly 2 is designed to extend generally along the opposed sides of the van or trailer having a plurality of side posts 4 and interior panels 6 disposed vertically in spaced relationship along the length of the vehicle. Each adjacent pair of the side posts may be spaced from each other by 12", 18" or 24" centers or other selected dimensions. Outer sidewall sheet 8 may comprise a single aluminum or steel sheet or a plurality of abutting sheets which are affixed by vertical arrays of mechanical fasteners 10, preferably rivets 10, as seen in FIG. 3. The sidewall assembly 2 is connected to a lower support chord 12 and at its upper end with a top rail extrusion 14 as seen in FIG. 10.

Each of the vertical posts 4 extend the height of the sidewall assembly 2 and is formed as an integral steel, plastic, or aluminum extrusion which may be shaped by stamping or other forming methods. The vertical posts 4 include a shallow modified central hat-shaped section 16 defined by flat central wall 16' and a pair of opposed integral lateral segments 18. The longitudinal flat walls 16' of side posts 4 are disposed in spaced parallel relationship to the interior surface 8' of the outer sheet 8. The lateral segments 22 also form smaller hat-shaped sections 19 in conjunction with base wall 20 and lateral segments on opposed sides of the central hat-shaped section 16 formed by wall 16' and segments 18. The base wall 20 is positioned in flush relationship to the inner surface 8' of side sheet 8. The vertical arrays of rivets 10 are directed through side sheet 8 and each of the walls 20 of the side post 4 for unitary securement. The opposed edges of the beams 4 include a pair of angular sections or flanges 24 pointing inwards whereby the edge section or flange 26 projects toward outer side sheet 8 and terminates in spaced relationship to surface 8' to create a continuous vertical slot 28 for receiving an edge portion of liner 6 to be described. Although it is within the scope of the invention to employ other dimensions of posts in conjunction with the invention as required, one suitable post 4 has an overall horizontal width of seven (7) inches with interior wall 16 extending two and three quarter (2¾) inches and walls 20 extending one and one eighth (1⅛) inch each. In such a construction, the overall width of the sidewall assembly to inner face of wall 4 can be approximately 0.5 inches or less, although widths of the sidewall assembly 2 greater than 0.5 inches may be utilized.

The plastic panel or liner 6 in the form of a plastic extrusion and the like has a flat central portion 30 creating a face 32 confronting side sheet 8 and face 34 forming the interior lining wall. The light color of the liner 6 produces a lighter environment within the van or trailer. The interior face 34 is disposed generally along the same vertical plane as the interior face of wall 16' of post 4 for creating a smooth interior surface. The panel or liner 6 further is provided with vertical side portions in the form of edges offset from central portion 30 which are inserted into the slots 28 in frictional contact with side posts 4 and side sheet surface 8'. The width of the projecting edge portions are approximately equal or larger than the spacing between the side post edges or flanges 26 and the side sheet surface 8' forming the slot 28. The side panel 6 may be comprised of a suitably flexible material which can be snapped or bent into place into the slot 28 into contact with both the inner surface 8' of sheet 8 and edge 6 of the side post 4. The plastic panel 6 comprises a single sheet extending the height of the sidewall 2 from the lower support chord 12 to the upper chord 14. Since the liner 6 is secured in the slot 28 of into contact with both the inner surface 8' of sheet 8 and the edge 26 of the side post 4. The plastic panel 6 comprises a single sheet extending the height of the sidewall 2 from the lower support chord 12 to the upper chord 14. Since the liner 6 is secured in the slot 28 of the adjacent posts 4, no mechanical fasteners or chemical substances are needed to secure the liner 6. It is within the scope of the invention, however, to secure the liner 6, including other modifications hereinafter described, to the post 4 by mechanical fasteners if desired.

The foregoing combination of side posts 4, liner 6, and side sheet 8 provides a sidewall assembly 2 of high strength in use, but with a minimal weight and width for significant advantages in a wall of a van or trailer, for an increase of cargo space and reduction of manufacture costs. As will be disclosed later, side assembly 2 can be further strengthened, if desired, through techniques to be described. In the embodiment of FIGS. 1 to 3, the sidewall is adequately strong in the absence of the foam material between the outer sheet 8 and the outer surface of the plastic panel 6 that will be described. Caulking may be used at the bottom portion 14a of upper rail 14 and the top portion 12a of lower chord 12 to seal the liners 6 therewith to prevent the accumulation of substances within the sidewall assembly itself for maintaining sanitary conditions in uses in which such an environment is useful.

Referring now to FIG. 4, there is illustrated a second embodiment of the sidewall assembly of the invention, generally designated by reference numeral 2a. The sidewall assembly 2a has a plurality of side posts 4a, interior plastic liner 6a, and an outer side sheet 8a. The side posts 4a, the plastic liner 6a, and side sheet 8a are arranged along the length of the van or trailer in a similar manner as described with reference to the first embodiment of FIGS. 1 to 3. The posts 4a include a similar cross section as illustrated as side posts 4 in FIGS. 2 and 3, except that the terrace/outer flange/edge portion 24a comprises a longitudinally extending edge portion that provides means to generally space liner 6a from outer side sheet 8a. The flat central wall/central portion 16a' of the side posts 4a lies in spaced relation to side sheet 8a and extends generally between the opposed edges of adjacent plastic liners 6a to interconnect with a modified construction of the plastic liner 6a as will be described. As in the previous embodiment, the wall 20a of the opposed small hat-shaped sections of post 4a are riveted/coupled in contacting relationship with side sheet 8a by rivets 10a that are covered by liner 6a. As shown in FIG. 4, inner ends of rivets 10a are positioned between liners 6a and outer side sheet 8a.

As seen in FIG. 4, the central portions 30a of the plastic liner 6a extend generally the width between the opposed edges of adjacent side posts 4a. The section 30a is provided with an angularly arranged projections 40a extending outwardly toward the outer side sheet 8a and having an enlarged end 40a'. A portion of projection 40a is positioned between the side post 4a and the outer side sheet 8a and positioned adjacent to an outwardly facing surface of side post 4a. The projection 40a forms a groove 42a for receiving the edge of the adjacent side post 4a to snap-in. As further seen in FIG. 4, the edge/side portion 34a extends beyond the smaller hat-shaped section 19 of the side post 4a and terminates with a right angled protuberance 34b extending outwardly toward outer side sheet 8a and having a rounded end 34c to contact an inwardly facing surface of the segment/terrace/wall 20a of the smaller hat-shaped section 19 of the side post 4a. Angled protuberance 34b defines one of the opposed lateral-most, vertical edges of liner 6a. Respective walls 18a; the opposed, parallel wall (22 in FIG. 3); and wall 20a cooperate to define a channel that receives rounded end 34c of liner 6a and a portion of rivet 10a. The edge portion 34a in part serves to protect the posts and rivets from damage from external forces and forms an interior surface coplanar with the interior face formed by central portion 30a to create a continuous interior liner surface. The outer wall of the protuberance 34b is in contact or near contact with the wall 18a. In the second embodiment of FIG. 4, the interior liner panel 30a is snapped into position by being biased over the lateral-most, vertical edge of the portion 24a of the side post 4a to be received in the groove 42a and retained in position by the angular orientation of the projection 40a and its enlarged end 40a'. The rigidity of the side assembly 2a is further increased by the presence of a plurality of dome like projections 44a are formed on the liner 6a and have a contacting end 46a to contact the interior surface of liner 6a preventing outward deflection after impact. Although any number of projections 44a may be used in the embodiment of FIG. 4, a pair of such structures are shown. The projection may also be formed in other shapes than as shown.

Referring now to FIG. 5 there is illustrated a third embodiment of the invention of the application, generally designated as sidewall assembly 2b. The sidewall assembly 2b has a plurality of side posts 4b, a plastic liners 6b, and a side sheet 8b. The sidewall construction 2b is of a similar construction as the embodiment of FIG. 4, except that projections 44a have been eliminated in the spacing between the side sheet 8b and the wall 30b' of the liner 6b. A foam block material 50 is sandwiched between the plastic liner 6b and the interior wall 8b' of the aluminum side sheets 8b. The foam increases puncture resistant and increase rigidity of the sidewall assembly with a minimum contribution of weight and can be glued to each of the walls to insure stability, stiffness, and proper positioning. The foam block 50 can also be utilized to render the sidewall assembly 2 of the first embodiment of FIGS. 1 to 3 more rigid.

Referring now to FIGS. 6, 11, and 12, there is illustrated a first embodiment of an interlocking scuff strip of the invention, generally designated by reference numeral 60. As seen best in FIGS. 11 and 12, the scuff strip 60 comprises a strip of metal, such as, for example, aluminum, which is disposed in interlocking relationship beneath the liner panel 6 of the sidewall interior. The scuff strip 60 is intended to protect the sidewall assembly from movement of lading and articles in contact with the wall at lower portions and has a height proportionally less than the height of the sidewall assembly 2. As seen in FIG. 12, the outer surface 62 of the scuff strip lies in same approximate plane as the outer surface 34 of the liner 6 forming the interior wall of the van or trailer. As best illustrated in FIGS. 11 and 12, the upper edge 66 of the scuff strip lies in contacting relationship to the bottom edge 30' of the liner 6 to form a continuous sidewall interior surface. The scuff strip 60 interlocks with the adjacent side post 4 through an edge portion 66 having an enlarged head in surface 68 to contact the edge of bent section 26 of the side post within the slot 28 created with the side sheet 8. The plurality of T-shaped projections 70 extend into contact with the interior wall 8' of the side sheet 8 to maintain the spacing of the scuff sheet 60 from the sidewall, create rigidity and to maintain the interlocking relationship of the edge, portion 26 and enlarged head 68. As is the obvious from the previous discussion, scuff sheets 60 are positioned along the bottom of the sidewall assembly along its length beneath every interior panel 6.

Referring now to FIG. 7, there is illustrated a fourth embodiment of the side wall assembly of the invention, generally designated by reference numeral 60a. The liner 60a is similar to side sheet 30b previously described and is disposed. The liner 60a includes a flat wall 70 having a plurality of spaced projections 72 in contact with the side sheet 8 to maintain spacing between the liner 60a and the side sheet 8 and to increase rigidity of the wall structure. An angularly oriented projection 74 having an enlarged head portion 76 is formed on the liner 60a and is arranged to resiliently engage the edge portion 24a of side post 4a. Resilience of the metal projection 74 is increased by relief cut-out 78. The edge portion 80' of the liner 60a extends over the smaller hat-shaped section 19a of the side posts 4a and includes a right angle projection 82 in contact with the wall 20a. Thus, the construction of the liner 60a interlocks with the side post 4a and generally conforms to the construction of the cross section of the liner 60a to form a continuous surface down the sidewall assembly.

Referring now to FIGS. 10 and 11, it is illustrated that the sidewall assembly 2 extends between the bottom chord 12 and the upper chord 14. The configuration of the lower chord 12 and upper chord 14 shown in FIG. 11 may be used in conjunction with any of the embodiments of the sidewall assemblies herein disclosed, with or without scuff sheets.

The upper portion of the sidewall assembly is riveted along the length of the van or trailer to the lower flange 14a of upper chord 14 and to the upper flange 12a of lower chord 12.

Referring now to FIG. 8, there is illustrated another embodiment of the scuff strip, generally designated a scuff sheet 60b, and shown in attachment to the bottom support chord 14. The scuff strip 60b includes a flat panel 80 having a plurality of T-shaped projections 82 contacting the side sheet 8. An inverted L-shaped section 84 is provided adjacent to the side post 4b and includes a surface 84' in contact with the inner surface 8a of the sidewall 8. The peripheral portions edge 86 of the scuff sheet 82 includes an offset section 86' and a pair of projections 88 forming a nesting relationship of the edge portion 86' within a smaller U-shaped section 19a of the posts 4a. A rivet 90 extends through the edge portion 86, the sidewall 8, and the lower chord 12 to interconnect the bottom edges to the lower chord. The sidewall assembly may also be similarly attached to the upper chord (not shown).

Referring to FIG. 9, there is illustrated an example of a liner panel 6d and side post 4d being affixed to the upper chord 14 on flange 14a by a rivet 101. The liner 6d is similar to liner 6a illustrated in FIG. 4, but includes an additional projection 102 and a peripheral offset nesting edge 104. The rivet 101 extends through the offset edge portion 104 of the liner d., through wall 20d of post 4d and the flange of the upper chord 14 for attachment of liner and post to the upper chord. A washer or plate (not shown) may be positioned on the rivet 101 as a spacer between the flange and edge portion 104.

Referring to FIG. 12, there is illustrated the sidewall of the invention having a plurality of modified side posts 110 interconnected with plastic liners 112 in accordance with the invention. The posts 110 are formed with a plurality of open slots 114 along their height from the top chord 14 to the lower chord 12. The slots are generally equally spaced along the height of the side post 110 and are used as anchor slots to provide points at which securement elements may be inserted to secure the lading within the van or trailer. An enlarged spacing 116 is provided at the bottom of each post 110 to provide access to the interior for cleaning and removal of debris.

Referring to FIG. 13, there is illustrated another embodiment of the panel or liner, generally designated as panel or liner 6', for use with the wall assembly 2 of FIGS. 1-3. The liner 31' is generally similar to liner 6 except liner 6' includes a pair of protuberances 120 integrally formed extending into contact with inner wall 8' of side panel 80 for making the liner 6' more rigid. The protuberances 120 include flat side sheet abutting surfaces 122 for improved contact therewith. Other similar protuberances (not shown) may be placed between protuberances 120 if desired.

Referring now to FIGS. 14 to 16, there is illustrated another of the side wall assembly of the invention, generally designated by reference numeral 130. The side wall assembly 130 includes a plastic liner or panel 132 having flat inner face 132', and a side wall sheet 134, and a metal side post 136. The liner 132 is similar to the liner 6 disclosed in reference to FIGS. 1-3, but includes a protuberance 138 immediately adjacent the offset edge portion 139 which is disposed in slot 28' between the side post 136 and the side wall sheet 134. The central portion 140 of side post 136 includes a center hat-shaped section 142 and the edge portions include bordering reversed hat-shaped sections 144. A flange 146 extends on each side of hat-shaped sections 144 in an direction at an acute angle toward the side sheet 134 and outward relative to the van or trailer (not shown) from the plane of face 132'. The end 148 of the flange 146 is bent further toward the side sheet 134 to reduce exposure of the end 148 of the flange 146 to the cargo area of the van or trailer to reduce snagging of any vehicles of lading with the side post flanges 146.

What is claimed is:

1. A sidewall assembly for a transporting vehicle comprising
    an outer side sheet having an inner surface extending along a longitudinal axis,
    a plurality of vertical side posts being affixed to said outer side sheet, a portion of said side posts forming a generally flat central wall lying in spaced relationship to said inner surface of said side sheet, said side posts further having a pair of integral edge sections connected to said central wall, said edge sections having segments contacting said side sheet, said edge sections further having outer flanges integrally connected to said segments of said edge sections and being spaced from said inner surface, and
    a plurality of liners respectively extending between adjacent side posts, said liners having a central portion forming a generally flat interior face, said liners having integral side portions extending on opposite vertical sides of said central portion respectively for contacting said outer flanges of said side posts, and said integral side portions respectively extending generally beyond said segments, and said outer flanges of said side posts being positioned between the side portions of the liner and the outer side sheet.

2. The sidewall assembly according to claim 1 wherein a portion of the plurality of liners is positioned between an adjacent side post and the outer side sheet.

3. The sidewall assembly according to claim 1 further comprising a mechanical fastener extending through at least one of the plurality of vertical side posts and the outer sheet, wherein at least one of the plurality of liners covers the mechanical fastener.

4. The sidewall assembly according to claim 3 wherein the at least one side post defines a channel and a portion of the liner and at least a portion of the mechanical fastener are positioned in the channel.

5. A sidewall assembly for a transporting vehicle comprising
    an outer side sheet having an inner surface extending along a longitudinal axis,
    a plurality of vertical side posts being affixed to said outer side sheet, said side posts having a flat inner wall forming an interior face and a pair of vertical edge sections being respectively connected to opposite sides of said flat inner wall,
    a plurality of liners respectively extending between adjacent side posts, said plurality of liners each having a central portion and opposite integral side portions, and
    a plurality of mechanical fasteners extending through said pair of vertical edge sections for affixing said side posts to said outer side sheet, and said opposite integral side portions of said plurality of liners extending over a portion of said vertical edge sections of said side posts for generally covering said plurality of mechanical fasteners.

6. The sidewall assembly according to claim 5 wherein said vertical edge sections of said side posts include a wall portion in contact with said inner surface of said outer side sheet, said plurality of mechanical fasteners extending through said wall portion.

7. The sidewall assembly according to claim 5 wherein said side portions of said plurality of liners are coplanar with the inner face of said plurality of liners to form a generally continuous interior liner surface.

8. The sidewall assembly according to claim 7 wherein ends of the plurality of mechanical fasteners are positioned between the plurality of liners and the outer side sheet.

9. The sidewall assembly according to claim 5 wherein a vertical edge of said integral side portions of said liners are disposed adjacent to said flat inner wall of said side posts to form a generally flat, continuous surface of the sidewall assembly.

10. A sidewall assembly for a transporting vehicle comprising
at least one outer side sheet having an inner surface extending along a longitudinal axis,
a plurality of vertical side posts being affixed to said at least one outer side sheet, said side posts having a flat inner wall forming an interior face, a pair of vertical edge sections being respectively formed on opposite sides of said flat inner wall, and
a plurality of liners respectively extending between adjacent side posts, said plurality of liners each having a flat central portion and opposite integral side portions extending outward toward the outer side sheet, said integral side portions forming opposite edges disposed adjacent said flat inner wall of said side posts.

11. The sidewall assembly according to claim 10 wherein said flat inner wall and said flat central portion of said liners form a continuous flat interior face, said interior face of said liners is generally coplanar with said interior face of said posts.

12. The sidewall assembly according to claim 10 wherein said side posts include means to generally space said liners from said outer side sheet.

13. A sidewall assembly for a transporting vehicle comprising
an outer side sheet,
a plurality of vertical side posts,
a plurality of fasteners coupling the vertical side posts to the outer side sheet, and
a liner extending between adjacent side posts, a portion of the liner being positioned between at least a portion of one of the side posts and the outer side sheet, at least an end of one of the fasteners being positioned between the liner and the outer side sheet.

14. The sidewall assembly according to claim 13 wherein at least a portion of one of the side posts is positioned between the liner and the outer side sheet.

15. The sidewall assembly according to claim 13 wherein the liner is positioned adjacent an outwardly facing surface of one of the side posts and the liner is positioned adjacent an inwardly facing surface of said side post.

16. The sidewall assembly according to claim 15 wherein the end of the fastener is laterally positioned between the outwardly facing surface of said side post and the inwardly facing surface of said side post.

17. A sidewall assembly for a transporting vehicle comprising
an outer side sheet,
a plurality of vertical side posts coupled to the outer side sheet, and
a liner coupled to and extending between adjacent side posts, a portion of the liner being positioned between at least a portion of one of the vertical side posts and the outer side sheet, the liner and vertical side post cooperating to define the innermost surface of the sidewall assembly that is devoid of fastener-receiving openings.

18. The sidewall assembly according to claim 17 further comprising a plurality of mechanical fasteners coupling the plurality of vertical side posts to the outer side sheet, wherein an end of at least one of the mechanical fasteners is positioned between the outer side sheet and the liner.

19. The sidewall assembly according to claim 17 wherein an innermost surface of the liner is substantially coplanar with an innermost surface of at least one of the plurality of vertical side posts.

20. The sidewall assembly according to claim 19 wherein at least a portion of the one of the vertical side posts is positioned between the liner and the outer side sheet.

21. The sidewall assembly according to claim 20 further comprising another liner and at least a pair of mechanical fasteners coupling said one of the plurality of vertical side posts to the outer side sheet at a first vertical height, wherein the liners are spaced apart by a first distance and the pair of mechanical fasteners are spaced apart by a second distance that is greater than the first distance.

22. A sidewall assembly for a transporting vehicle comprising
an outer side sheet,
a plurality of vertical side posts,
a plurality of fasteners coupling the plurality of vertical side posts to the outer side sheet, and
a plurality of liners extending between adjacent side posts, a portion of at least one of the vertical posts being positioned between lateral-most, vertical edges of adjacent liners, the adjacent liners and at least one of the vertical side posts cooperating to define an innermost surface of the sidewall assembly devoid of fasteners.

23. The sidewall assembly according to claim 22 further comprising a plurality of mechanical fasteners coupling the plurality of vertical side posts to the outer side sheet.

24. The sidewall assembly according to claim 22 wherein a portion of at least one of the plurality of vertical side posts is positioned between a pair of lateral-most, vertical edges of adjacent liners.

25. The sidewall assembly according to claim 22 wherein a portion of at least one of the plurality of liners is positioned between at least one of the vertical side posts and the outer side sheet and a portion of said vertical side post is positioned between said liner and the outer side sheet.

26. The sidewall assembly according to claim 25 wherein the innermost surface of the sidewall assembly is substantially coplanar.

27. A sidewall assembly for a transporting vehicle comprising
an outer side sheet,
a plurality of vertical side posts coupled to the outer side sheet, the plurality of vertical side posts having an outer surface facing the outer side sheet and an inner surface facing away from the outer side sheet, and
an integral liner coupled to and extending between adjacent side posts, a first portion of the integral liner being positioned between at least a portion of at least one of the side posts and the outer side sheet and a second portion of the integral liner overlapping the inner surface of at least one of the side posts.

28. The sidewall assembly according to claim 27 further comprising a plurality of mechanical fasteners coupling the plurality of vertical side posts to the outer side sheet and an end of the plurality of mechanical fasteners is positioned between the integral liner and the outer side sheet.

29. The sidewall assembly according to claim 28 further comprising another liner, wherein a pair of the plurality of fasteners are positioned at a vertical height to couple one of the plurality of vertical side posts to the outer side sheet, the pair of fasteners are spaced apart by a first distance, and the liners are spaced apart by a second distance that is less than the first distance.

30. The sidewall assembly according to claim 27 wherein the plurality of vertical side posts include a first terrace that is spaced apart from the outer side sheet by a first distance and a second terrace spaced apart from the outer side sheet by a second distance that is less than the first distance, the second terrace including the portion of the inner surface overlapped by the integral liner.

31. A sidewall assembly for a transporting vehicle comprising
an outer side sheet,
a plurality of vertical side posts, at least one of the vertical side posts having opposed surfaces defining a channel,
a plurality of fasteners coupling the plurality of vertical side posts to the outer side sheet, at least a portion of one of the fasteners being positioned in the channel, and
a liner extending between adjacent vertical side posts, a portion of the liner being positioned in the channel.

32. The sidewall assembly according to claim 31 wherein the vertical side post defining the channel further includes a central channel and a wall positioned directly between the channel and the central channel.

33. The sidewall assembly according to claim 32 wherein the wall includes a curved portion.

34. The sidewall assembly according to claim 31 wherein the opposed surfaces are substantially parallel.

35. The sidewall assembly according to claim 31 wherein the liner and a portion of the vertical side post defining the channel cooperate to define a space directly therebetween, at least a portion of said fastener being positioned in the space.

36. The sidewall assembly according to claim 35 wherein a portion of the liner is positioned between the outer side sheet and the vertical side post defining the channel, and a portion of said vertical side post is positioned between the outer side sheet and the liner.

37. A sidewall assembly for a transporting vehicle comprising
an outer side sheet,
a plurality of vertical side posts, and
a liner extending between adjacent side posts, the liner having a substantially planar portion and a portion extending from the planar portion outwardly toward the outer side sheet, a portion of at least one of the vertical side posts being positioned between the planar portion of the liner and the outer side sheet.

38. The sidewall assembly according to claim 37 wherein the portion of the liner extending from the planar portion is positioned between the outer side sheet and the at least one vertical side post.

39. The sidewall assembly according to claim 38 wherein the portion of the liner extending from the planar portion is spaced apart from the outer side sheet.

40. The sidewall assembly according to claim 37 wherein the portion of the liner extending from the planer portion is positioned directly adjacent to the at least one vertical side post.

41. A sidewall assembly for a transporting vehicle comprising
an outer side sheet,
a plurality of vertical side posts,
a plurality of fasteners coupling the plurality of vertical side posts to the outer side sheet, an adjacent pair of the plurality of fasteners being spaced apart by a first distance, and
a plurality of liners extending between adjacent vertical side posts, a portion of the liner being positioned between at least one of the vertical side posts and the outer side sheet, an innermost portion of the liner and an innermost portion of the at least one vertical post being coplanar to define an innermost surface of the sidewall assembly, a pair of adjacent liners being spaced apart by a second distance that is less than the first distance.

42. The sidewall assembly according to claim 41 wherein a portion of each of the plurality of fasteners is positioned between the outer side sheet and the plurality of liners.

43. The sidewall assembly according to claim 42 wherein the innermost surface of the sidewall assembly is substantial devoid of fasteners.

44. The sidewall assembly according to claim 43 wherein a portion of each of the plurality of liners is positioned between the plurality of vertical side posts and the outer side sheet and a portion of each of the plurality of vertical side posts is positioned between the outer side sheet and the plurality of liners.

45. A sidewall assembly for a transporting vehicle comprising
an outer side sheet,
a plurality of vertical side posts, and
an integral liner extending between adjacent side posts,
a portion of the outer side sheet, at least one of the vertical side posts, and the integral liner being layered to define a strata,
at a first location in the strata, a portion of the integral liner is positioned between a portion of said vertical side post and a portion of the outer side sheet, and
at a second location in the strata, a portion of the vertical side post is positioned between a portion of the integral liner and a portion of the outer side sheet.

46. The sidewall assembly according to claim 45 further comprising a plurality of fasteners coupling the plurality of vertical side posts to the outer side sheet, wherein at least one of the vertical side posts defines a channel and a portion of at least one of the fasteners and a portion of at least one of the liners is positioned in the channel.

47. The sidewall assembly according to claim 46 wherein the plurality of vertical side posts and the integral liner cooperate to define an innermost surface of the sidewall assembly that is devoid of fasteners.

48. The sidewall assembly according to claim 47 wherein a lateral-most vertical edge of one of the vertical side posts is positioned between the integral liner and the outer side sheet.

49. The sidewall assembly according to claim 48 wherein at least a portion of said vertical side post is positioned between a lateral-most vertical edge of the integral liner and the outer side sheet.

50. A sidewall assembly for a transporting vehicle comprising
an outer side sheet,
a plurality of vertical side posts,
a plurality of fasteners coupling the plurality of vertical side posts to the outer side sheet, and
a liner extending between adjacent side posts, at least one of the vertical side posts having first, second, third, fourth, and fifth terraces in series, the first terrace being spaced apart from the outer side sheet by a first distance, the second terrace being positioned adjacent to the outer side sheet to receive at least one of the plurality of fasteners, the third terrace being spaced apart from the outer side sheet by a second distance that is greater than the first distance, the fourth terrace being positioned adjacent to the outer side sheet to receive at least one of the plurality of fasteners, and the fifth terrace between spaced apart from the outer side sheet by a third distance that is less than the second distance.

51. The sidewall assembly according to claim 50 wherein the innermost surface of the liner is spaced apart from the outer side sheet by a distance substantially equal to the second distance.

52. The sidewall assembly according to claim 50 wherein the difference between the first and second distances is substantially equal to a thickness of the liner adjacent the first terrace.

53. The sidewall assembly according to claim 52 wherein the liner is integral and includes a substantially planar portion and an outwardly extending portion positioned between at least one of the vertical side posts and the outer side sheet.

54. A sidewall assembly for a transporting vehicle comprising
an outer side sheet having an inner surface extending along a longitudinal axis,
a plurality of vertical side posts being affixed to said outer side sheet, a portion of said side posts forming a generally flat central wall lying in spaced relationship to said inner surface of said side sheet, said side posts further having a pair of integral edge sections connected to said central wall, said edge sections having first segments contacting said side sheet, said edge sections further having second segments integrally connected to said first segments of said edge sections and being spaced from said inner surface, and
a plurality of liners respectively extending between adjacent side posts, said liners having a central portion forming a generally flat interior face, said liners having integral side portions extending on opposite vertical sides of said central portion respectively for contacting said second segments of said side posts, and said integral side portions respectively extending generally beyond said first segments, and said second segments being positioned between the side portions of the liner and the outer side sheet.

55. The sidewall assembly according to claim 54 wherein the second segment defines the lateral-most, vertical edge of the vertical side posts.

56. The sidewall assembly according to claim 55 wherein the lateral-most, vertical edge of the vertical side posts are positioned between the plurality of liners and the outer side sheet.

* * * * *